United States Patent
Rasmussen et al.

(10) Patent No.: US 9,219,965 B2
(45) Date of Patent: Dec. 22, 2015

(54) BODY-WORN CONTROL APPARATUS FOR HEARING DEVICES

(71) Applicant: OTICON A/S, Smørum (DK)

(72) Inventors: Karsten Bo Rasmussen, Smørum (DK); Lars Ivar Hauschultz, Valby (DK)

(73) Assignee: OTICON A/S, Smorum (DK)

( * ) Notice: Subject to any disclaimer, the term of this patent is extended or adjusted under 35 U.S.C. 154(b) by 0 days.

(21) Appl. No.: 14/073,392

(22) Filed: Nov. 6, 2013

(65) Prior Publication Data

US 2014/0126759 A1    May 8, 2014

Related U.S. Application Data

(60) Provisional application No. 61/723,325, filed on Nov. 7, 2012.

(30) Foreign Application Priority Data

Nov. 7, 2012 (EP) .................................. 12191533

(51) Int. Cl.
*H04R 25/00* (2006.01)
*H04B 5/00* (2006.01)
*G08C 19/10* (2006.01)

(52) U.S. Cl.
CPC ............... *H04R 25/55* (2013.01); *H04R 25/453* (2013.01); *H04R 25/558* (2013.01)

(58) Field of Classification Search
CPC .......... H04R 25/55; H04R 5/04; G06F 3/017; G06F 3/0346; G06F 3/03547; G06F 3/044; G06K 19/07788; G06K 7/10326; H04B 5/0012
USPC ............. 381/314–315; 340/870.37; 455/45.1; 341/33
See application file for complete search history.

(56) References Cited

U.S. PATENT DOCUMENTS

| | | | | |
|---|---|---|---|---|
| 5,914,701 A * | 6/1999 | Gersheneld et al. | ........... | 345/156 |
| 6,087,652 A * | 7/2000 | O'Meara et al. | ........... | 250/214.1 |
| 8,405,528 B2 * | 3/2013 | Aghaei et al. | ................... | 341/33 |
| 8,588,684 B2 * | 11/2013 | Mori et al. | ................... | 455/41.1 |
| 8,814,426 B2 * | 8/2014 | Nakamura et al. | ........... | 374/121 |
| 2005/0238190 A1 | 10/2005 | Rohrlein | | |
| 2008/0048878 A1* | 2/2008 | Boillot | ...................... | 340/686.1 |
| 2008/0192961 A1 | 8/2008 | Radivojevic et al. | | |
| 2011/0044483 A1* | 2/2011 | Edgar | .......................... | 381/314 |

FOREIGN PATENT DOCUMENTS

EP    2 320 682 A2    5/2011

\* cited by examiner

*Primary Examiner* — Paul S Kim
*Assistant Examiner* — Norman Yu
(74) *Attorney, Agent, or Firm* — Birch, Stewart, Kolasch & Birch, LLP

(57) ABSTRACT

A control apparatus comprises a housing and is adapted to control a hearing device by recognizing predefined gestures made by the device wearer by moving one arm and/or or hand relative to the housing when the housing is in an operating position at or on the wearer's body. The housing comprises a reference electrode coupled capacitively to the wearer when the housing is in the operating position and a first sensor electrode. The control apparatus further comprises: a first signal generator to provide a first electric probe signal between the first sensor electrode and the reference electrode; a first measurement circuit to determine first signal values in dependence on the impedance between the first sensor electrode and the reference electrode; a detector to recognize gestures in dependence on the first signal values; and a control unit to provide control commands to the hearing device in dependence on recognized gestures.

19 Claims, 4 Drawing Sheets

BODY-WORN CONTROL APPARATUS FOR HEARING DEVICES

CROSS-REFERENCE TO RELATED APPLICATIONS

This application claims priority under 35 U.S.C. §119(e) to U.S. Provisional Application No. 61/723,325 filed on Nov. 7, 2012. This application also claims priority under 35 U.S.C. §119(a) to patent application Ser. No. 12/191,533.4 filed in Europe on Nov. 7, 2012. The entire contents of all the above applications is hereby incorporated by reference.

TECHNICAL FIELD

The present invention relates to a body-worn control apparatus for hearing devices. More specifically, the invention relates to a control apparatus, which is adapted to control the operation of a hearing device such as e.g. a hearing aid, a listening device, an active ear-protection device, an earphone or a headset, and which has a capacitive sensor for detecting hand gestures.

The invention may e.g. be useful in applications such as a hearing aid for compensating for a hearing-impaired person's loss of hearing capability, a listening device for augmenting a normal-hearing person's hearing capability, an active ear-protection device for protecting a person's hearing capability, or an earphone or a headset for electronic audio communication with others.

BACKGROUND ART

Many hearing-aid wearers want to conceal their hearing impairment. Obviously, manual control of the hearing aid should therefore be as inconspicuous as possible. Depending on circumstances, this may also be of relevance for other kinds of hearing devices. At the same time, many hearing-device wearers have difficulties with sight and with precise operation of their fingers, which hinder them in operating small control elements on the hearing devices or on remote controls.

In the art, hearing devices are known which comprise capacitive sensors that allow the wearer to control the operation of the devices. Such sensors either operate as touch sensors detecting when an object, such as the wearer's finger, touches the sensor surface, or as proximity sensors detecting when the wearer's hand is within a specific range of the sensor surface.

For many hearing-device wearers, establishing physical contact between a finger and a relatively small touch sensor may be difficult, and this increases the risk of revealing the hearing device or the remote control to others. Increasing the sensor area is often prohibited by the physical size of the devices. Furthermore, the distance measurement of capacitive proximity sensors is generally not very reliable due to non-controllable influences from e.g. ambient temperature and humidity, and unreliable user interface controls are notoriously known to cause user frustration. The control of differing device functions may be achieved by providing multiple touch sensors or proximity sensors, which however typically increases the above mentioned problems. Alternatively, temporal properties of signals from fewer sensors may be analysed to detect e.g. sequences of touches or gestures. Such sequences are, however, in general difficult to learn for many hearing-device wearers, and do also increase the risk of revelation.

There is thus still a need in the art for a control apparatus which allows easy, inconspicuous and reliable control of a hearing device with less dependence on the manual and mental skills of the wearer.

DISCLOSURE OF INVENTION

It is an object of the present invention to provide such a control apparatus.

This and other objects of the invention are achieved by the invention defined in the accompanying independent claims and as explained in the following description. Further objects of the invention are achieved by the embodiments defined in the dependent claims and in the detailed description of the invention.

Embodiments of the invention are directed towards controlling a hearing device in dependence on recognising predefined gestures made by a wearer of the hearing device by moving one of his or her arms and/or the hand of said arm relative to a control apparatus comprising a housing, a sensor electrode and a reference electrode, the reference electrode being arranged to couple capacitively to a body area of the wearer. Providing an electric probe signal between the sensor electrode and the reference electrode at multiple signal frequencies, determining signal values at multiple signal frequencies in dependence on the impedance between the sensor electrode and the reference electrode; recognising said gestures in dependence on changes in ratios between the signal values determined at different signal frequencies, and providing control commands to the hearing device in dependence on recognised gestures allows for very versatile and reliable gesture control of the hearing device. Furthermore, the invention may be implemented such that the gestures are both inconspicuous and easy to learn and perform, also for hearing-device wearers with reduced manual and/or mental skills.

In the present context, a "hearing device" refers to a device, such as e.g. a hearing aid, a listening device or an active ear-protection device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A "hearing device" further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve and/or to the auditory cortex of the user.

A hearing device may be configured to be worn in any known way, e.g. as a unit arranged behind the ear with a tube leading air-borne acoustic signals into the ear canal or with a loudspeaker arranged close to or in the ear canal, as a unit entirely or partly arranged in the pinna and/or in the ear canal, as a unit attached to a fixture implanted into the skull bone, as an entirely or partly implanted unit, etc. A hearing device may comprise a single unit or several units communicating electronically with each other.

More generally, a hearing device comprises an input transducer for receiving an acoustic signal from a user's surroundings and providing a corresponding input audio signal and/or a receiver for electronically receiving an input audio signal, a signal processing circuit for processing the input audio signal and an output means for providing an audible signal to the user in dependence on the processed audio signal. Some hearing devices may comprise multiple input transducers, e.g. for providing direction-dependent audio signal processing. In some hearing devices, the receiver may be a wireless receiver. In some hearing devices, the receiver may be e.g. an input amplifier for receiving a wired signal. In some hearing devices, an amplifier may constitute the signal processing circuit. In some hearing devices, the output means may comprise an output transducer, such as e.g. a loudspeaker for providing an air-borne acoustic signal or a vibrator for providing a structure-borne or liquid-borne acoustic signal. In some hearing devices, the output means may comprise one or more output electrodes for providing electric signals.

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal in the cochlear liquid, e.g. through the oval window. In some hearing devices, the output electrodes may be implanted in the cochlea or on the inside of the skull bone and may be adapted to provide the electric signals to the hair cells of the cochlea, to one or more hearing nerves and/or to the auditory cortex.

A "hearing system" refers to a system comprising one or two hearing devices, and a "binaural hearing system" refers to a system comprising one or two hearing devices and being adapted to cooperatively provide audible signals to both of the user's ears. Hearing systems or binaural hearing systems may further comprise "auxiliary devices", which communicate with the hearing devices and affect and/or benefit from the function of the hearing devices.

Auxiliary devices may be e.g. remote controls, remote microphones, audio gateway devices, mobile phones, public-address systems, car audio systems or music players. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person.

The terms "multiple signal frequencies" and "different frequencies" may comprise any number of frequencies larger than two, e.g. a number of discrete frequencies (e.g. three or more) or a continuous range of frequencies (e.g. between a minimum frequency $f_{min}$ and a maximum frequency $f_{max}$). In an embodiment, the "multiple signal frequencies" at which the electric probe signal is provided by the first signal generator and the "multiple signal frequencies" for which the measurement circuit determines the first signal values are identical or overlapping. In an embodiment, the frequencies for which the measurement circuit determines the first signal values are a subset of the frequencies at which the electric probe signal is provided. In an embodiment, the "multiple signal frequencies" for which the measurement circuit determines the first signal values are identical to or overlapping with the "different signal frequencies" for which changes in ratios between the signal values are determined. In an embodiment, the "different signal frequencies" for which changes in ratios between the signal values are determined are a subset of the "multiple signal frequencies" for which the measurement circuit determines the first signal values.

As used herein, the singular forms "a", "an", and "the" are intended to include the plural forms as well (i.e. to have the meaning "at least one"), unless expressly stated otherwise. It will be further understood that the terms "has", "includes", "comprises", "having", "including" and/or "comprising", when used in this specification, specify the presence of stated features, integers, steps, operations, elements and/or components, but do not preclude the presence or addition of one or more other features, integers, steps, operations, elements, components and/or groups thereof. It will be understood that when an element is referred to as being "connected" or "coupled" to another element, it can be directly connected or coupled to the other element, or intervening elements may be present, unless expressly stated otherwise. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF THE DRAWINGS

The invention will be explained in more detail below in connection with preferred embodiments and with reference to the drawings in which.

The figures are schematic and simplified for clarity, and they just show details, which are essential to the understanding of the invention, while other details are left out. Throughout, like reference numerals and/or names are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

MODE(S) FOR CARRYING OUT THE INVENTION

Figure 1:
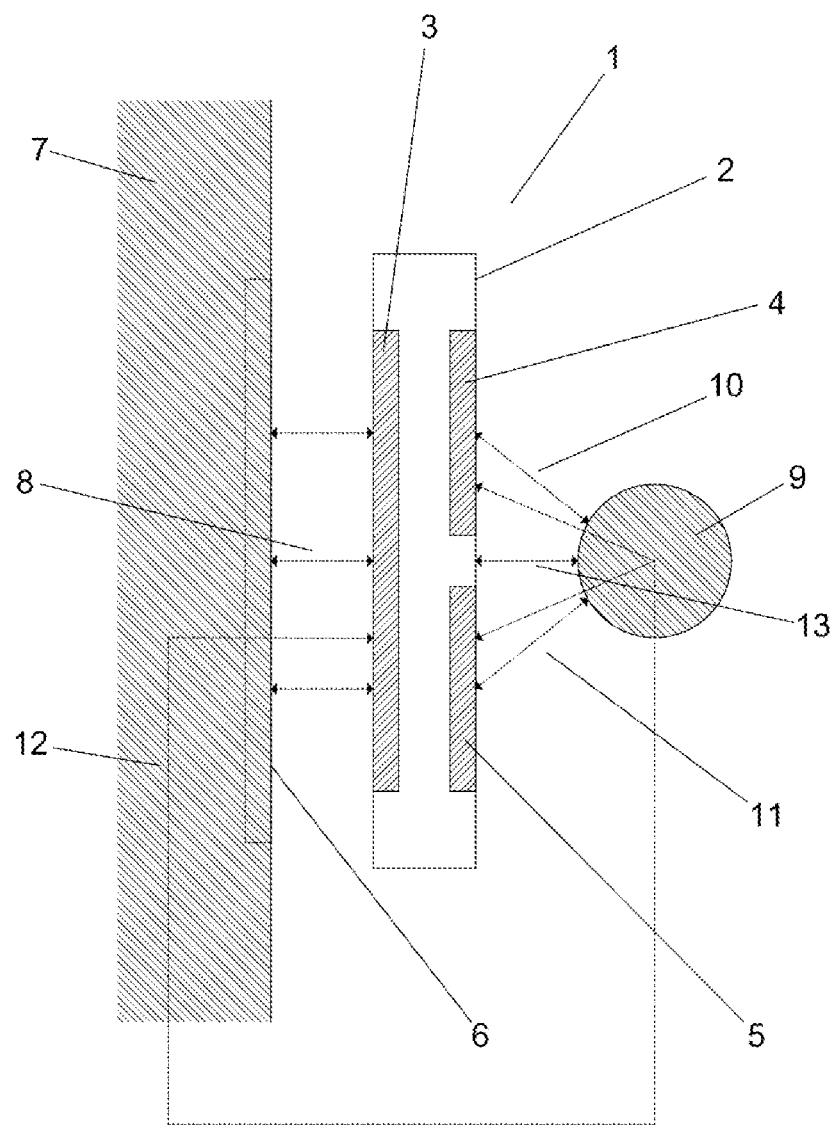
FIG. 1 shows an embodiment of a control apparatus according to the invention.

The control apparatus 1 shown in FIG. 1 comprises a housing 2 with a reference electrode 3 and two sensor electrodes 4, 5, each arranged in or on a separate portion of the housing 2. The control apparatus 1 is intended to be worn by a person, i.e. the wearer, in an operating position in which the portion of the housing 2 where the reference electrode 3 is arranged faces towards an area 6 of the wearer's body 7. In the operating position, the reference electrode 3 thus couples capacitively to the body area 6 as illustrated by the arrows 8. The portions of the housing 2 where the sensor electrodes 4, 5 are arranged face away from the body area 6, and the sensor electrodes 4, 5 thus couple capacitively with an arm 9 of the wearer when it is in the vicinity of the sensor electrodes 4, 5 as illustrated by the arrows 10, 11. In the present context, the hand and the fingers of an arm are considered to be part of the arm.

The human body is generally a good conductor for electric signals, and thus, in the configuration shown, electric signal paths 12 are formed extending from the respective sensor electrodes 4, 5, through the capacitances 10, 11 to the arm 9, through the body 7 to the body area 6, and through the capacitance 8 to the reference electrode 3. The impedances of the signal paths 12 contribute to the respective impedances between the sensor electrodes 4, 5 and the reference electrode 3. The impedances between the sensor electrodes 4, 5 and the reference electrode 3 thus change with changing positions of the arm 9 relative to the housing 2, e.g. with changing distance 13 between the housing 2 and the arm 9, and this effect forms the basis of the present invention.

Figure 2:
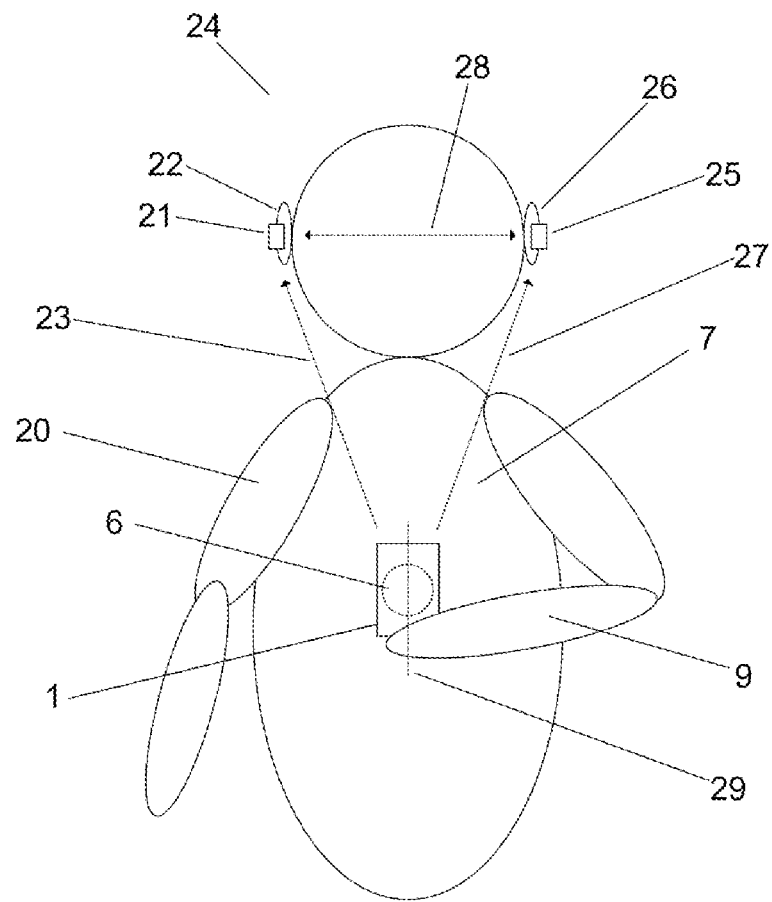
FIG. 2 shows an embodiment of a hearing system according to the invention.

In FIG. 2, the control apparatus 1 is arranged in an example operating position on the chest of the wearer, such that an area 6 of the chest couples capacitively to the reference electrode 3. The control apparatus 1 is intended to recognise gestures of the arm 9 relative to the body 7, and thus, the control apparatus 1 may alternatively have its intended operating position anywhere else on the body 7, except on the arm 9 itself. Accordingly, the body area 6 may be located on any part of the body 7 that is not part of the arm 9. The other arm 20 or a leg may very well serve as a suitable location. The housing 2 may have any shape, but preferably has a credit-card like shape or another shape allowing it to be carried in a pocket in the clothing. Alternatively, it may have a shape and configuration resembling a wrist watch allowing it to be carried in a band around the arm 20. As a further alternative, the control apparatus 1 may be carried in a neck loop.

The control apparatus 1 is adapted to control a hearing device 21 and may thus function as a remote control. The hearing device 21 is arranged to provide an audible signal to an ear 22 of the wearer and may be located at or in the ear 22, e.g. in the ear canal. Alternatively, the hearing device 21 may be located in other positions on the head of the wearer or be entirely or partly implanted in the head. The control apparatus 1 may transmit control commands to the hearing device 21 via a wired or wireless connection 23, e.g. by means of inductive signals, radio frequency signals, Bluetooth signals or the like. The control apparatus 1 and the hearing device 21 together constitute a hearing system 24, which may further comprise a second hearing device 25 arranged to provide an audible signal to the other ear 26. The control apparatus 1 may transmit control commands directly to the second hearing device 25 via a second wired or wireless connection 27 or indirectly via the hearing device 21. The hearing devices 21, 25 may also communicate with each other, e.g. by means of a wired or wireless connection 28 similar to the connection 23 between the control apparatus 1 and the hearing device 21.

Figure 3:
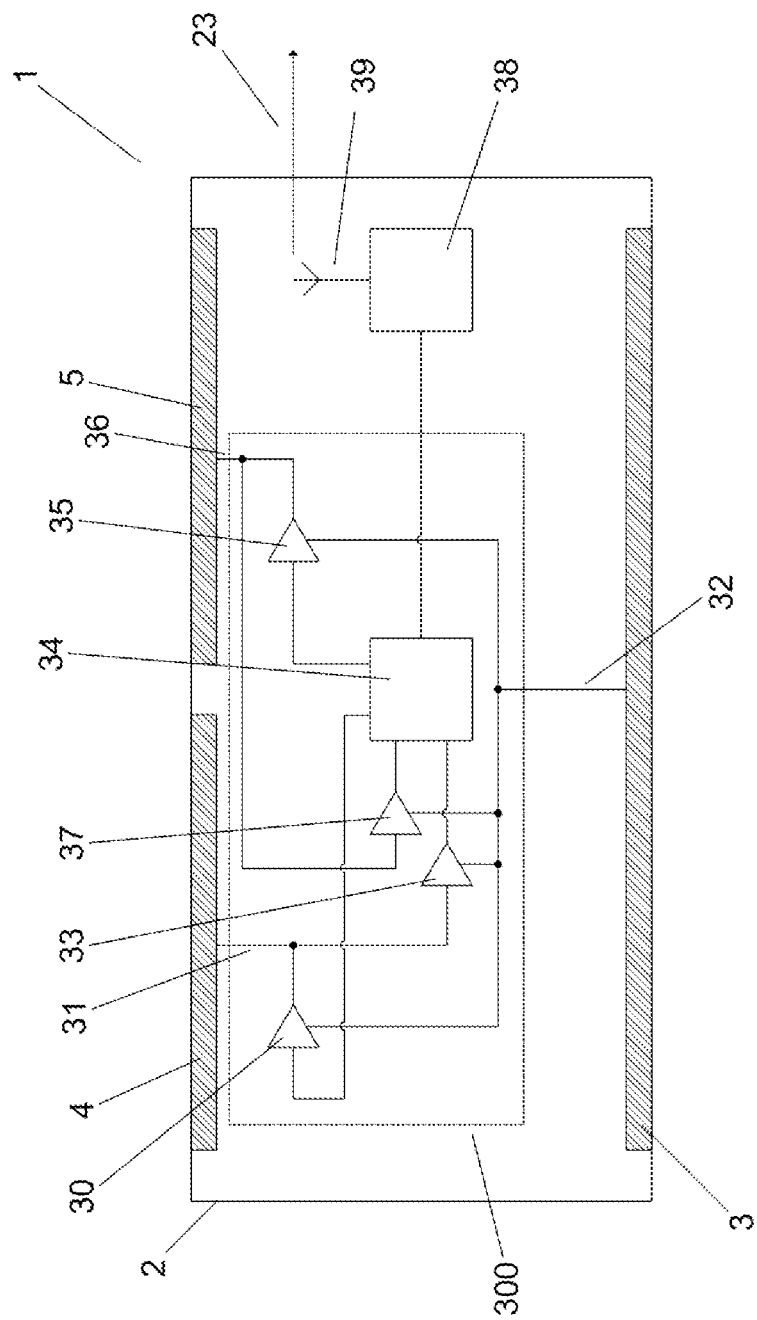
FIG. 3 shows details of an embodiment of a control apparatus according to the invention.

The control apparatus 1 shown in FIG. 3 comprises two signal generators 30, 35, two measurement circuits 33, 37, a detector 34, a control unit 38 and a radio transmitter 39. An output of the first signal generator 30 is connected to the first sensor electrode 4 via a first connection 31. An output of the second signal generator 35 is connected to the second sensor electrode 5 via a second connection 36. An input of the first measurement circuit 33 is connected to the first sensor electrode 4 via the first connection 31, and an input of the second measurement circuit 37 is connected to the second sensor electrode 5 via the second connection 36. Respective reference terminals of the two signal generators 30, 35 and the two measurement circuits 33, 37 are connected to the reference electrode 3 via a third connection 32. An input of each of the two signal generators 30, 35 is connected to a respective control output of the detector 34, and a data output of each of the two measurement circuits 33, 37 is connected to a respective data input of the detector 34. A data output of the detector 34 is connected to an input of the control unit 38, and an output of the control unit 38 is connected to an input of the radio transmitter 39. The signal generators 30, 35, the measurement circuits 33, 37 and the detector 34 together form a gesture recognition circuit 300.

The signal generators 30, 35 provide electric probe signals respectively between the first sensor electrode 4 and the reference electrode 3 and between the second sensor electrode 5 and the reference electrode 3 in dependence on respective control signals received from the detector 34. The signal generators 30, 35 have relatively high output impedances, such that the actual voltages between the sensor electrodes 4, 5 and the reference electrode 3 depend on the external impedances between the respective electrodes 3, 4, 5, i.e. the impedances formed outside the housing 2. The measurement circuits 33, 37 measure the actual voltages respectively between the first sensor electrode 4 and the reference electrode 3 and between the second sensor electrode 5 and the reference electrode 3, determine corresponding signal values and provide the determined signal values to the detector 34.

In the case that the housing 2 is mainly made of non-conductive material, any of the electrodes 3, 4, 5 may be arranged on the inside of the respective portions of the housing 2 or within the material of the housing 2. The reference electrode 3 may further function as a common ground or shield for the electronic circuits of the control apparatus 1. The reference electrode 3 may extend to further portions of the housing 2, e.g. the housing sides and/or a frame surrounding the sensor electrodes 4, 5. One or more of such portions of the housing 2 may mainly comprise a conductive material, such as metal. The electrodes 3, 4, 5 must be electrically isolated from each other, and should preferable be arranged such that the direct or internal impedances between respective pairs of electrodes 3, 4, 5 are small, so that the external impedances have a substantial influence on the voltages measured by the measurement circuits 33, 37.

The detector 34 controls the signal generators 30, 35 to provide the respective electric probe signal at multiple signal frequencies, e.g. as a frequency sweep. Alternatively, the multiple signal frequencies may be a number of discrete frequencies, e.g. two or more, such as three or more frequencies. The measurement circuits 33, 37 preferably comprise respective controllable frequency filters for filtering the measured voltages in order to reject noise during determination of the signal values. The pass frequencies of the controllable frequency filters are preferably controlled synchronously with the respective signal generators 30, 35. In an alternative embodiment, the signal generators 30, 35 provide the electric probe signals as broad-band signals, and the measurement circuits 33, 37 perform a frequency analysis, such as a Fast Fourier Transformation (FFT), on the measured voltages.

The measurement circuits 33, 37 preferably also determine derivatives of the measured voltages with respect to frequency and include the determined derivatives in the signal values provided to the detector 34. This allows the detector 34 to react to minute changes in the frequency position of dips and peaks in the external impedances.

For each of the sensor electrodes 4, 5, the detector 34 determines ratios between signal values obtained at different frequencies and evaluates the development of the determined ratios over time. When a change occurs, the detector 34 compares the ratios, the changes of the ratios and/or the determined derivatives with one or more predetermined templates in order to recognise respective predefined gestures. Such comparison may include comparing time sequences of determined signal value ratios and/or time sequences of determined ratio changes. The detector 34 may thus recognise a gesture based on the temporal behaviour of the determined signal value ratios for one or more of the sensor electrodes 4, 5. The detector 34 may further determine the state of the control apparatus 1, i.e. whether the housing 2 is in the operating position or not, and/or the distance between the housing 2 and the arm 9 by comparing the determined signal value ratios with one or more predetermined templates.

Preferably, the templates are determined and stored in the detector 34 during a training period. To this end, the detector 34 may comprise a learning classifier (not shown), e.g. comprising a neural network in which case the templates are stored as part of the neural network itself. During the training period, the control apparatus 1 is arranged in the intended operating position on the body of the wearer, which then repeatedly performs each gesture to be learned. For each gesture, the learning classifier receives the signal values and determines corresponding templates, which are stored together with an identification of the respective gesture. During operation, the learning classifier categorises the gestures in dependence on the signal values and/or on determined derivatives and the stored templates. In this way, the control apparatus may be optimally adapted to the specific gestures and conditions of the wearer. In the case that the hearing device 21 is a hearing aid, the training period may preferably form part of a fitting session, which it is common to perform in order to adapt the signal processing of the hearing aid to the hearing impairment of the wearer.

The control unit 38 receives gesture data, i.e. data indicating recognised gestures, states and/or distances 13, from the detector 34 and provides corresponding control commands to the hearing device 21 and/or the hearing device 25 via the radio transmitter 39. Depending on the desired type of wired or wireless connection 23, the radio transmitter 39 may be replaced by other suitable communication means. The hearing devices 21, 25 receive the control commands and adjust their audio signal processing in dependence on the received commands. Such adjustments may comprise any adjustment known in the art, e.g. change of gain, on/off switching of the audio signal processing in the hearing device, changing of hearing aid programme, switching to other audio inputs, e.g. to answer a phone call, or the like.

The control unit 38 preferably decides which command(s) to provide in dependence on data previously stored in the control unit 38, e.g. during the training period. Thus, the allocation of commands to gestures may be configurable. The control unit 38 may e.g. provide different control commands for each recognised gesture in order to allow for quick control of the hearing device 21. Additionally, or alternatively, control commands may be allocated to respective gesture sequences. The control unit 38 may thus provide a single control command in response to the recognition of a sequence of gestures. The first gesture in such a sequence should not be allocated a command of its own. Such a single gesture may be used as a preamble for several gesture sequences, thus allowing the detector 34 to easily determine whether to expect a sequence of gestures or not. Different preambles may further be used to distinguish between different classes of commands. For instance, one predefined gesture may be used as a preamble for volume control commands, and another gesture may be used as a preamble for programme selection commands.

The control apparatus may have only one sensor electrode 4, 5 or may alternatively be equipped with three, four or even more sensor electrodes 4, 5 together with a corresponding number of signal generators 30, 35 and measurement circuits 33, 37. Generally, increasing the number of sensor electrodes 4, 5 allows for more reliable gesture and state recognition, for more reliable determination of the distance 13 and/or for better spatial resolution.

The detector 34 is preferably adapted to recognise as gestures movements of the arm 9 and/or the hand in one or more predefined directions parallel to the surface of the body area 6, i.e. parallel to the reference electrode 3. The portions of the housing 2 wherein respectively the reference electrode 3 and the sensor electrodes 4, 5 are arranged are therefore preferably parallel to each other, at least to an extent that allows such gestures to be made relatively close to the sensor electrodes 4, 5. In order to allow hiding the control apparatus 1, e.g. in or below clothing, the frequencies of the electric probe signals, the output impedances of the signal generators 30, 35 and the measurement ranges of the measurement circuits 33, 36 are dimensioned such that gestures made within a distance 13 of about 10 mm to the portions of the housing 2 wherein the sensor electrodes 4, 5 are arranged are reliably recognised by the detector 34. Since these parameters depend on several factors, such as e.g. the sizes and the mutual arrangement of the electrodes 3, 4, 5, the internal impedances between the electrodes 3, 4, 5 and the intended operating position of the control unit 1, they are preferably determined by experimentation during development of apparatus according to the invention. Depending on the intended use, and in dependence on the manual skills of the intended wearer, the control apparatus 1 may be adapted to detect gestures within a range of distances 13 between a minimum distance, e.g. 1 mm, 2 mm or 5 mm, and a maximum distance, e.g. 10 mm, 20 mm or 50 mm. Preferably, the control apparatus 1 is adapted to ignore gestures significantly outside the range in order to avoid accidental triggering of control commands.

In order to recognise the movement direction and/or the speed of gestures parallel to the surface of the body area 6, the detector 34 preferably determines a point in time in which a predetermined event occur in the signal values for each of two or more sensor electrodes 4, 5 and subsequently evaluate the temporal relationship of the determined points in time. For instance, if the occurrence of a dip in the measured voltage at a specific frequency indicates that the wearer passes a finger directly above the first sensor electrode 4, then the time period between this event and a subsequent event indicating that the finger is directly above the second sensor electrode 5 may be used to determine that the finger is moved in a direction from the first sensor electrode 4 towards the second sensor electrode 5. Furthermore, the speed of the movement may be determined from the time period and the (known) distance between the sensor electrodes 4, 5. The detector 34 may preferably use the learning classifier to determine directions and speed based on corresponding input data provided to the detector 34 during the training period described further above. Similar recognition of direction and/or speed may be made with only one sensor electrode 4, 5, however less reliable and/or with less spatial resolution. Gestures made with different directions and/or with different speeds may thus be recognised by the detector 34 as different gestures.

Similarly, gestures where one stretched finger is moved across one or more sensor electrodes 4, 5 will typically cause the temporal behaviour of the determined signal values to differ from the temporal behaviour when two, three or four stretched fingers are moved across the sensor electrodes 4, 5, particularly when the fingers are spread, and the detector 34 may distinguish between different gestures in dependence on these differences.

For instance, the control unit 38 may be programmed—or trained—to provide a control command for increasing the gain of the hearing device 21 when an upwards directed gesture is recognised (as seen in the operation position with the wearer standing or sitting upright) and to provide a command for decreasing the gain when a downwards gesture is recognised. The size of the up/down gain step may e.g. be determined based on the recognised number of stretched fingers.

Figure 4:
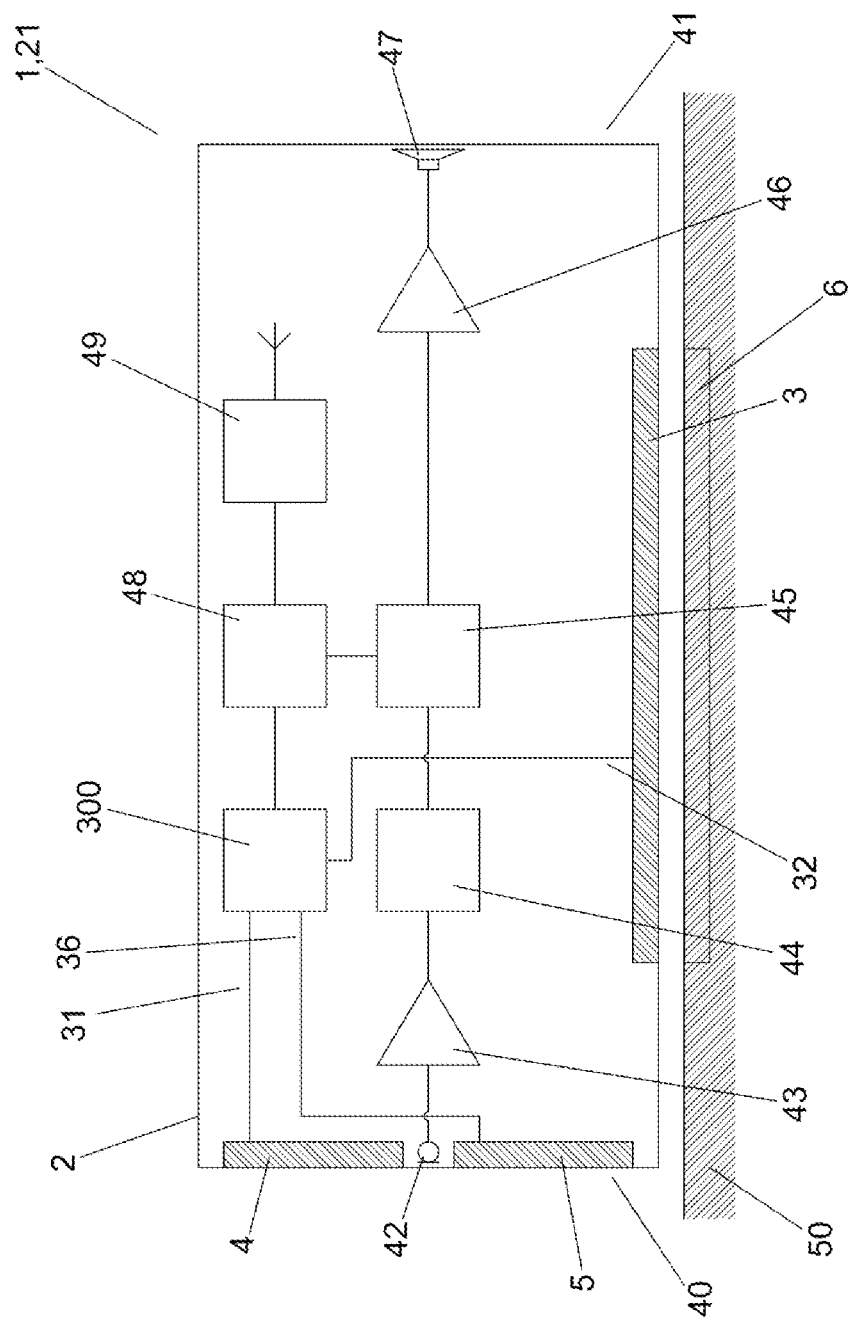
FIG. 4 shows details of a further embodiment of a control apparatus according to the invention.

In the embodiment shown in FIG. 4, the control apparatus 1 and the hearing device 21 are arranged in a common housing 2. The control apparatus 1 and the hearing device 21 may be mechanically connected in alternative ways, e.g. with separate housings 2 connected through a detachable coupling. The housing 2 has an external end 40 facing the free air and an internal end 41 facing the tympanum when the housing 2 is in its intended operating position, wherein it is at least partly inserted into the ear canal of an ear 22 of the wearer.

The housing 2 comprises a gesture recognition circuit 300 as well as reference and sensor electrodes 3, 4, 5 connected and operating as described above. In this embodiment, however, the reference electrode 3 is arranged in or on a portion of the housing 2 facing a wall of the ear canal when the housing 2 is in its operating position, such that the reference electrode 3 couples to the body 7 through tissue of the ear canal that thus constitutes the area 6 designated in FIG. 1. The sensor electrodes 4, 5 are arranged in or on respective portions of the housing 2 located at the external end 40 of the housing 2.

The housing 2 further comprises a microphone 42, a preamplifier 43, a digitiser 44, a signal processor 45, a power amplifier 46 and a loudspeaker 47 constituting an audio signal path of the hearing device 21. The microphone 42 is arranged at the external end 40 of the housing 2 to receive an acoustic input signal from the wearer's surroundings and provide a corresponding microphone signal to the preamplifier 43. The preamplifier 43 is adapted to amplify the microphone signal and provide the amplified microphone signal to the digitiser 44. The digitiser 44 is adapted to digitise the amplified microphone signal and provide a digitised audio signal to the signal processor 45, which is adapted to modify the digitised audio signal in accordance with the purpose of the hearing device 21, e.g. to improve or augment the hearing capability of the wearer and/or to amplify or convey a received audio signal to the wearer. The signal processor 45 is adapted to provide the modified audio signal to the power amplifier 46, which may e.g. comprise a pulse-width modulator, which is adapted to provide a corresponding amplified and/or pulse-width modulated signal to the loudspeaker 47. The loudspeaker 47 is arranged at the internal end 41 of the housing 2 to transmit an acoustic output signal corresponding to the amplified and/or pulse-width modulated signal towards the tympanum of the wearer.

The housing 2 further comprises a control unit 48 and a wireless transceiver 49. The control unit 48 is connected to receive gesture data from the gesture recognition circuit 300 and to provide corresponding control commands to the signal processor 45 of the hearing device 21. Thereby, the control unit 48 may perform any or all of the functions described above for the control unit 38. The control unit 48 may further combine gesture data received from the gesture recognition circuit 300 with gesture data received from a further hearing device 25 and/or a remote control, e.g. a further body-worn control apparatus 1 as shown in FIG. 2, via the transceiver 49 for determining the control commands to provide to the signal processor 45. The control unit 48 may further provide gesture data received from the gesture recognition circuit 300 to the transceiver for transmission to the further hearing device 25, which may thus in a similar way combine gesture data obtained at both ears 22, 26. Thus, also two-hand gestures may be used to control the hearing devices 21, and/or similar gestures may invoke different control commands, depending on the gestures being executed at the left ear 22, the right ear 26 or at a further body-worn control apparatus 1 as shown in FIG. 2. Depending on the particular control command, the hearing aids 21, 25 may synchronise or otherwise coordinate their actions taken in response to the control commands.

The control unit 48 and the transceiver 49 may further be adapted to forward communication data comprising e.g. control commands, audio signals, status information and/or settings between the control unit 48 and/or the signal processor 45 on one side and the further hearing device 25 and/or the remote control and/or a fitting system on the other side, thus allowing the two hearing devices 21, 25 in the hearing device system to communicate wirelessly with each other. The wireless connections 23, 27, 28 may further be used for wireless binaural reception of television sound, and/or for wireless remote control and/or wireless fitting of the two hearing devices 21, 25.

The signal processor 45 is adapted to adjust its modification of the digitised audio signal in response to information comprised in the control commands and/or the communication data received from the control unit 48. The signal processor 45 may further be adapted to provide the modified audio signal in dependence on an audio signal comprised in communication data. This allows the hearing device 21 to change its audio signal processing in response to e.g. control commands, status information and/or audio signals received from the remote control or the further hearing device 25 and/or to include such audio signals in the acoustic signal transmitted by the loudspeaker 47. Further sources of audio signals may e.g. be a so-called audio gateway device adapted to transmit an audio signal from an external device, such as e.g. a mobile phone or a TV set, to the hearing device 21.

Due to the arrangement of the sensor electrodes 4, 5 at the external end 40 of the housing 2, the hearing device 21 may be controlled by means of gestures performed close to the ear 22. Depending on the particular arrangement of the sensor electrodes 4, 5 relative to each other, the control apparatus 1 may recognise gestures made in a forward or backwards direction and/or in an upwards or downwards direction with respect to the ear. Such simple—and thus easy to learn—gestures are preferably allocated to frequently used control commands, such as programme change and gain adjustments.

In order to reduce the risk of feedback-caused howling or other artefacts when the arm 9 is in the vicinity of the ear 22, e.g. during the execution of gestures, the detector 34 may determine the distance 13 between the arm 9 and the housing 2, and the control apparatus 1 may provide an attenuation command to the hearing device 21 in dependence on the distance 13 decreasing below a predefined threshold. The hearing device 21 is preferably adapted to reduce the gain in its audio signal processing—at least temporarily—in dependence on receiving the attenuation command. Such automatic gain reduction may be performed directly, e.g. by reducing the over-all gain or by filtering one or more frequency ranges in which feedback-caused artefacts typically occur, or indirectly by increasing the adaptation speed of an automatic feedback cancelling system, which then automatically decreases the gain for frequencies where the acoustic feedback is large. The automatic gain reduction is particularly useful during insertion and extraction of the hearing device 21 into/from the ear canal, since these manoeuvres may take relatively long time and cause the acoustic feedback path to change both rapidly and substantially.

The signal values provided by the measurement circuits 33, 37 are typically highly dependent on whether the hearing device 21 is in its operating position, i.e. on, at or in the ear or in the ear canal, or not. The detector 34 may thus use the signal values provided by the measurement circuits 33, 37 to recognise a first state in which the housing 2 is not in the operating position and a second state in which the housing 2 is in the operating position, and the control apparatus 1 may provide a start-up command to the hearing device 21 in dependence on recognising a transition from the first state to the second state followed by an increase of said distance. The hearing device 21 preferably recommences or commences full operation in dependence on receiving the start-up command. This allows the hearing device 21 to execute a fully automatic start-up after insertion into the ear canal. The transition from the first state to the second state ensues when the hearing device 21 is inserted into the ear canal. The increase of the distance 13 ensues thereafter when the hand 9 used to insert the hearing device 21 is removed from the ear 22.

In any embodiment, the gesture of placing the palm of the hand 9 such that it covers all of the sensor electrodes 4, 5 typically creates particularly distinct patterns in the signal values provided by the measurement circuits 33, 37, and this gesture may thus be allocated to control commands that it is particularly important not invoke accidently, e.g. commanding the hearing device 21 to switch off or to enter a sleep mode. The reliability of the detection of this particularly distinct gesture (and of any other gesture) may be increased by requiring the covering of the sensor electrodes 4, 5 to be maintained for a predefined time period, e.g. a hold time between 3 and 5 seconds. During this hold time, the control apparatus 1 may transmit a warning control command to the hearing device 21. The hearing device 21 may react to this command by playing an audible signal to the wearer, warning him or her that the particular command will be executed if the hand 9 is maintained in its current position.

In any embodiment, the control apparatus 1 may provide an "undo" command to the hearing device 21 in dependence on recognising an "undo" gesture within a predefined time period, e.g. 5 or 10 s, after a preceding gesture. The undo gesture is preferably a particularly distinct gesture, such as shortly placing the entire hand 9 over multiple sensor electrodes 4, 5, and serves to allow revocation of the preceding command. When receiving the undo command, the hearing device 21 preferably revokes the immediately preceding control command, i.e. takes back the changes made in response to that command.

In any embodiment, the control apparatus 1 may execute automatic fine tuning of the detector 34 by adapting the learned templates to ratios, changes of ratios and/or derivatives determined during operation of the control apparatus 1. The fine tuning may ensue in essentially the same way as the learning during the training period, however based on negative feedback from the wearer. When the control apparatus 1 within a predefined time period, e.g. 5 or 10 s, after recognition of a gesture and the corresponding provision of a control command to the hearing device 21 recognises the undo gesture, then the control apparatus 1 adjusts the templates such that thereafter, the particular control command will not—or at least less likely—be provided when the same determined ratios, changes of the ratios and/or derivatives occur. Conversely, when the undo command is not recognised within the predefined time period after providing the control command to the hearing device 21, the control apparatus 1 may adjust the templates such that thereafter, the particular control command will—at least more likely—be provided when the same determined ratios, changes of the ratios and/or derivatives occur. In order to avoid a complete reconfiguration over time of the gesture recognition, the fine tuning may be constrained to cause only slow and/or only small changes to the templates compared to the changes made or allowed during the training period.

The detector 34, the control unit 38, 48, the radio transmitter 39, the signal processor 45 and the transceiver 49 are preferably implemented mainly as digital circuits operating in the discrete time domain, but any or all portions hereof may alternatively be implemented as analog circuits operating in the continuous time domain. The same applies to such portions of the signal generators 30, 35 and the measurement circuits 33, 37 that may be implemented digitally. Such digital circuits may be implemented in any suitable combination of hardware, firmware and software and/or in any suitable combination of hardware units. Furthermore, any single hardware unit may execute the operations of several functional blocks in parallel or in interleaved sequence and/or in any suitable combination thereof.

Further modifications obvious to the skilled person may be made to the disclosed apparatus, devices, systems and/or methods without deviating from the scope of the invention. Within this description, any such modifications are mentioned in a non-limiting way.

Some preferred embodiments have been described in the foregoing, but it should be stressed that the invention is not limited to these, but may be embodied in other ways within the subject-matter defined in the following claims. For example, the features of the described embodiments may be combined arbitrarily, e.g. in order to adapt the system, the devices, the apparatus and/or the method according to the invention to specific requirements.

It is further intended that the structural features of the system and/or devices described above, in the detailed description of 'mode(s) for carrying out the invention' and in the claims can be combined with the methods, when appropriately substituted by a corresponding process. Embodiments of the methods have the same advantages as the corresponding systems and/or devices.

Any reference numerals and names in the claims are intended to be non-limiting for their scope.

The invention claimed is:

1. A control apparatus comprising
a housing and adapted to control a hearing device in dependence on recognising predefined gestures made by a wearer of the hearing device by moving one of his or her arms and/or the hand of said arm relative to the housing when the housing is in an operating position at or on the wearer's body, the housing comprising
a reference electrode arranged to couple capacitively to a body area of the wearer when the housing is in the operating position and
a first sensor electrode, the control apparatus further comprising:
a first signal generator adapted to provide a first electric probe signal between the first sensor electrode and the reference electrode;
a first measurement circuit adapted to determine first signal values in dependence on the impedance between the first sensor electrode and the reference electrode;
a detector adapted to recognise said gestures in dependence on the first signal values; and
a control unit adapted to provide control commands to the hearing device in dependence on recognised gestures, wherein
the first signal generator is adapted to provide the electric probe signal at multiple signal frequencies;
the first measurement circuit is adapted to determine the first signal values at multiple signal frequencies; and
the detector is adapted to recognise said gestures in dependence on changes in ratios between the first signal values determined at different signal frequencies.

2. A control apparatus according to claim 1 and further comprising:
- a second sensor electrode;
- a second signal generator adapted to provide a second electric probe signal at multiple signal frequencies between the second sensor electrode and the reference electrode; and
- a second measurement circuit adapted to determine second signal values at multiple signal frequencies in dependence on the impedance between the second sensor electrode and the reference electrode, wherein
- the detector further is adapted to recognise said gestures in dependence on ratios between the first and the second signal values.

3. A control apparatus according to claim 2, wherein the first and/or the second signal generator is adapted to provide the first and/or the second electric probe signal as a frequency sweep.

4. A control apparatus according to claim 2, wherein the first and/or the second measurement circuit further is adapted to determine derivatives with respect to frequency of the first and/or the second signal values and wherein the detector further is adapted to recognise said gestures in dependence on the determined derivatives.

5. A control apparatus according to claim 4, wherein the detector comprises a learning classifier adapted to categorise said gestures in dependence on the first and/or the second signal values and/or on the determined derivatives and further in dependence on data provided to the learning classifier during a training period.

6. A control apparatus according to claim 5, wherein the learning classifier comprises a neural network.

7. A control apparatus according to claim 1, wherein the detector is adapted to recognise as gestures movements of said arm and/or said hand in one or more predefined directions parallel to the surface of said body area.

8. A control apparatus according to claim 1, wherein the detector is adapted to distinguish between said gestures in dependence on the movement speed of said arm and/or said hand.

9. A control apparatus according to claim 1, wherein the detector is adapted to distinguish between said gestures in dependence on the number of stretched fingers on said hand.

10. A control apparatus according to claim 1, wherein the control apparatus comprises communication means for transmitting control commands from the control unit to a hearing device arranged in a further, separate housing.

11. A hearing system comprising a control apparatus according to claim 1 and a hearing device adapted to be arranged at or in an ear of the wearer or in or on the head of the wearer, to process an audio signal, to receive control commands from the control apparatus and to adjust its audio signal processing in dependence on received control commands.

12. A hearing system according to claim 11, wherein the control apparatus is mechanically connected to the hearing device, and wherein the reference electrode is arranged to couple capacitively to a body area that is located at or in said ear.

13. A hearing system according to claim 12, wherein the detector is further adapted to determine a distance between said arm and the housing, wherein the control apparatus is adapted to provide an attenuation command to the hearing device in dependence on said distance decreasing below a predefined threshold, and wherein the hearing device is adapted to reduce the gain in its audio signal processing in dependence on receiving the attenuation command.

14. A hearing system according to claim 13, wherein the detector is further adapted to recognise a first state in which the housing is not in the operating position and a second state in which the housing is in the operating position, wherein the control apparatus is adapted to provide a start-up command to the hearing device in dependence on recognising a transition from the first state to the second state followed by an increase of said distance, and wherein the hearing device is adapted to recommence or commence full operation in dependence on receiving the start-up command.

15. A method for controlling a hearing device in dependence on recognising predefined gestures made by the hearing-device wearer by moving one of his or her arms and/or the hand of said arm relative to a control apparatus comprising
- a housing,
- a sensor electrode and
- a reference electrode, the reference electrode being arranged to couple capacitively to a body area of the wearer, the method comprising:
- providing an electric probe signal between the sensor electrode and the reference electrode at multiple signal frequencies;
- determining signal values at multiple signal frequencies in dependence on the impedance between the sensor electrode and the reference electrode;
- recognising said gestures in dependence on changes in ratios between the signal values determined at different signal frequencies; and
- providing control commands to the hearing device in dependence on recognised gestures.

16. A hearing system according to claim 11, wherein the control apparatus and the hearing device are arranged in a common housing.

17. A hearing system according to claim 16, wherein the hearing device comprises a hearing aid, an active ear protection device, an ear phone or a headset.

18. A hearing system according to claim 14, wherein the control apparatus and the hearing device are arranged in a common housing.

19. A hearing system according to claim 11, wherein the hearing device comprises a hearing aid, an active ear protection device, an ear phone or a headset.

* * * * *